…

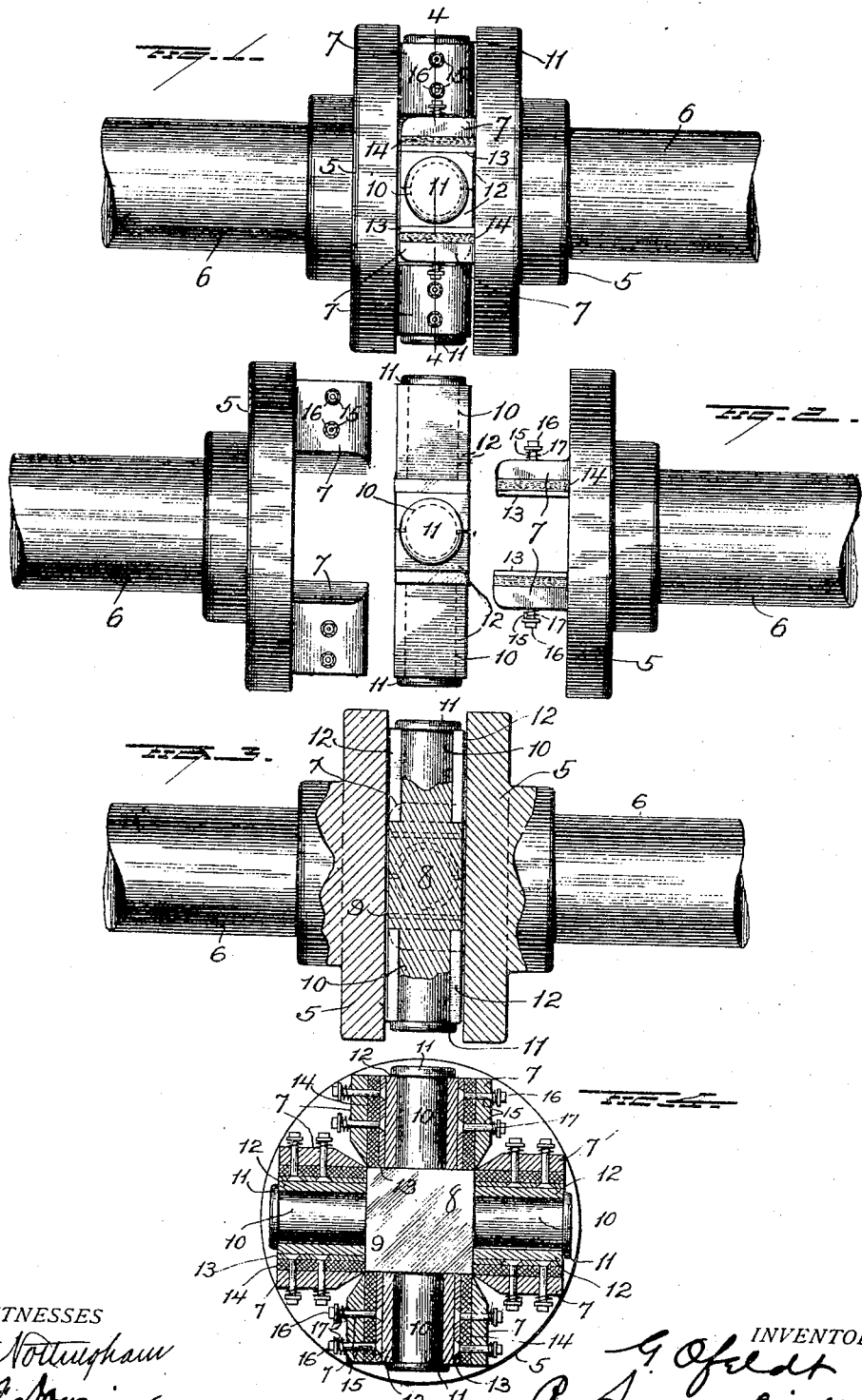

UNITED STATES PATENT OFFICE.

GEORGE OFELDT, OF PHILADELPHIA, PENNSYLVANIA.

SHAFT-COUPLING.

1,313,109.   Specification of Letters Patent.   Patented Aug. 12, 1919.

Application filed April 29, 1918. Serial No. 231,495.

*To all whom it may concern:*

Be it known that I, GEORGE OFELDT, a citizen of the United States, and a resident of Philadelphia, in the county of Philadelphia and State of Pennsylvania, have invented certain new and useful Improvements in Shaft-Couplings; and I do hereby declare the following to be a full, clear, and exact description of the invention, such as will enable others skilled in the art to which it appertains to make and use the same.

My invention relates to an improvement in shaft couplings, the object being to provide a coupling that will compensate for any variation in the axial alinement of the shafts, and in which the parts subjected to wear can be readily and quickly replaced.

With this end in view my invention consists in the parts and combinations of parts and in the details of construction as will be more fully explained and pointed out in the claims.

In the accompanying drawings Figure 1 is a view in elevation of my improved coupling; Fig. 2 is a view of the parts separated; Fig. 3 is a view in longitudinal section and Fig. 4 is a view in transverse section on the line 4—4 of Fig. 1.

5 represents the coupling heads which are rigidly secured to the ends of the shafts 6 to be coupled. Each head consists of a disk provided on its outer face with two pairs of oppositely disposed inwardly projecting shoulders or abutments 7, the latter being of such size that the shoulders 7 on one head rest at right angles to, and in a plane between the shoulders on the other head, so that the shoulders of each head may abut against its companion head and receive the end thrust of the latter and particularly so in case of an angular relation between the two shafts.

8 is the connector comprising a central portion 9 and four integral arms 10 disposed ninety degrees apart so that two oppositely disposed arms will rest between the shoulders 7 on one head 5 of the coupling, and the two other oppositely disposed arms will be between the shoulders 7 of the other head and thus form the driving connection between the two heads. The arms 10 are cylindrical as shown, and each is provided at its outer end with an integral circumferential flange 11 which operates to hold the bushings 12 in place. There is a bushing for each arm, and each bushing is composed of two angular blocks having a semi-cylindrical groove which when applied to an arm surround the same and form a continuous bearing.

Interposed between the shoulders 7 and the bushings 12 are the cushion plates 13, backed by rubber or other resilient backing 14 which are held in place by the bolts 15 passing through the parts 13—14 and the shoulders 7, and which are held in place by nuts 16, metal springs 17 being interposed, if desired, between the nuts and the shoulders 7 for yieldingly holding the part 14 in contact with its shoulder. By employing a cushion for each shoulder all the shocks and consequent stresses on the shoulders 7 will be more or less absorbed.

The bushings 12 are preferably made of fiber, and when applied to the arms 10 make a close fit between the shoulders 7, or if the cushions 13—14 be employed, make a close fit with the cushion plates 13, so that there will be no lost motion between the two heads except that due to the yield of the cushions 14.

I prefer to make the shoulders 7 of such length that there will be room for limited movement of either head 5 in the directions of the long axes of the arms, and that, when such limit has been reached, the shoulders on one head will abut against the shoulders of the other head, but instead of limiting the movement by the contact of the shoulders, the same result can be accomplished by the contact of the arms with the parallel shoulders.

This provision for movement of the two heads permits of the sliding of the shoulders on the bushings and a longitudinal movement of the bushings between the shoulders, hence if the two shafts be not in correct alinement the difference will be compensated for by the movement of the parts of the coupling.

Again, as the two heads are not connected except by the interlocking action between the shoulder and the connector, if one shaft be set more or less obliquely to the other the heads are free to separate and thus compensate for the defect in alinement.

The bushings are retained in place by the flanges on the arms, hence by releasing the shaft from its hanger bearings and lifting it, the bushings can be removed and replaced, and as they are accessible at the ends, the movable parts of the coupling can be kept well lubricated.

This improved coupling not only provides for a driving connection between the two shafts, free from lost motion, but it also provides for an expansible and laterally movable connection, which will accommodate itself to any and all inaccuracies in the alinement of the shafts thus insuring the free and smooth running of both members of the shaft.

It is evident that many slight changes might be resorted to in the relative arrangement of parts shown and described without departing from the spirit and scope of my invention. Hence I would have it understood that I do not wish to confine myself to the exact construction shown and described, but—

Having fully described my invention what I claim as new and desire to secure by Letters-Patent, is:—

1. In a shaft coupling, the combination of two heads each having two pairs of inwardly projecting shoulders, the shoulders of each pair having parallel inner faces, and the shoulders of each head being at right angles to the shoulders on the companion head, and a connector having members resting between the shoulders of both heads but not locked to either, the widths of said connector and its members being of approximately the length of the shoulders so that each head forms an abutment for the shoulders on the other head.

2. In a shaft coupling, the combination of two heads each having two pairs of parallel inwardly projecting shoulders, the shoulders of each head being at right angles to the shoulders of the other head and adapted to abut against said other head, and a four arm connector interposed between the heads with its arms between the shoulders on the heads but not locked to either the heads or shoulders.

3. In a shaft coupling, the combination of two heads each having two pairs of inwardly projecting shoulders having parallel inner faces, and each head forming a stop or abutment for the shoulders on the other head, and a four arm connector between the heads with its arms between the shoulders on the heads but not locked to said shoulders, and a bushing embracing each arm and slidably mounted between the shoulders.

4. In a shaft coupling, the combination of two heads each having two pairs of inwardly projecting shoulders, the shoulders of each head being at right angles to the shoulders on the other head, and each head forming an abutment for the ends of the shoulders in the other head, a four arm connector interposed between the heads with its arms between the shoulders but not locked to the latter, each arm having a circumferential flange at its outer end, and a two part bushing embracing each and held in place by the flange, and having a sliding bearing between one pair of shoulders.

5. In a shaft coupling, the combination of two heads each having two pairs of inwardly projecting shoulders, a yielding facing for the inner face of each shoulder and a four arm connector interposed between the two heads, each arm of the connector resting between a pair of shoulders on a head.

In testimony whereof, I have signed this specification in the presence of two subscribing witnesses.

GEORGE OFELDT.

Witnesses:
W. M. JACKSON,
R. H. PITTMAN.